United States Patent
Aslot et al.

(10) Patent No.: US 11,210,282 B2
(45) Date of Patent: *Dec. 28, 2021

(54) DATA PLACEMENT OPTIMIZATION IN A STORAGE SYSTEM ACCORDING TO USAGE AND DIRECTIVE METADATA EMBEDDED WITHIN THE DATA

(71) Applicant: INTERNATIONAL BUSINESS MACHINES CORPORATION, Armonk, NY (US)

(72) Inventors: Vishal C. Aslot, Austin, TX (US); Adekunle Bello, Pflugerville, TX (US); Gregory J. Boss, Saginaw, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 16/048,977

(22) Filed: Jul. 30, 2018

(65) Prior Publication Data

US 2018/0336238 A1  Nov. 22, 2018

Related U.S. Application Data

(63) Continuation of application No. 13/764,064, filed on Feb. 11, 2013, now Pat. No. 10,120,891.

(51) Int. Cl.
*G06F 16/23* (2019.01)
*G06F 16/13* (2019.01)
*G06F 16/16* (2019.01)

(52) U.S. Cl.
CPC .......... *G06F 16/2365* (2019.01); *G06F 16/13* (2019.01); *G06F 16/16* (2019.01)

(58) Field of Classification Search
CPC ....... G06F 16/2365; G06F 16/13; G06F 16/16
See application file for complete search history.

(56) References Cited

U.S. PATENT DOCUMENTS

| | | | |
|---|---|---|---|
| 5,345,575 A | * | 9/1994 | English ................. G06F 3/0601 360/78.04 |
| 5,761,678 A | | 6/1998 | Bendert et al. |
| 7,647,327 B2 | | 1/2010 | Aguren |

(Continued)

FOREIGN PATENT DOCUMENTS

| | | |
|---|---|---|
| CN | 1613263 A | 5/2005 |
| JP | 2005026800 A | 1/2005 |
| WO | 2009048216 A1 | 4/2009 |

*Primary Examiner* — Neveen Abel Jalil
*Assistant Examiner* — Hubert Cheung
(74) *Attorney, Agent, or Firm* — Griffiths & Seaton PLLC (57) ABSTRACT

For improving data placement optimization in a computing storage environment, an application layer and/or a user are allowed to attach anticipated usage metadata and directive metadata to a file. The anticipated usage metadata contains a plurality of attributes describing characteristics of the file and the directive metadata contains directives comprising storage instructions for the file. Additionally, a set of metadata is added to the file at a time of creation. The core metadata includes characteristics such as an importance factor as to how essential the anticipated usage metadata and directive metadata should be followed when determining file placement with the computing storage environment.

27 Claims, 7 Drawing Sheets

(56) References Cited

U.S. PATENT DOCUMENTS

| | | | |
|---|---|---|---|
| 7,827,286 B1* | 11/2010 | Deflaux | G06F 16/1827 709/226 |
| 8,086,582 B1* | 12/2011 | Wills | G06F 16/13 707/705 |
| 8,127,095 B1* | 2/2012 | Colgrove | G06F 11/1435 711/162 |
| 8,195,627 B2 | 6/2012 | Wong et al. | |
| 8,214,839 B1* | 7/2012 | Cooley | H04L 67/18 718/104 |
| 8,280,853 B1* | 10/2012 | Lai | G06F 16/113 707/651 |
| 8,463,798 B1* | 6/2013 | Claudatos | G06F 11/1461 707/752 |
| 8,972,354 B1* | 3/2015 | Telang | G06Q 10/10 707/653 |
| 9,648,102 B1* | 5/2017 | Davis | H04L 67/1097 |
| 2002/0040370 A1* | 4/2002 | Entwistle | G06F 16/93 |
| 2003/0046270 A1* | 3/2003 | Leung | G06F 16/13 |
| 2005/0065961 A1 | 3/2005 | Aguren | |
| 2005/0289193 A1* | 12/2005 | Arrouye | G06F 16/164 |
| 2008/0091953 A1 | 4/2008 | Bowers | |
| 2008/0221856 A1 | 9/2008 | Dubnicki et al. | |
| 2008/0288947 A1* | 11/2008 | Gokhale | G06F 3/0613 718/103 |
| 2009/0094676 A1 | 4/2009 | Burugula et al. | |
| 2010/0153352 A1 | 6/2010 | Hahn et al. | |
| 2010/0217612 A1* | 8/2010 | Apacible | G06F 16/22 705/1.1 |
| 2011/0231374 A1 | 9/2011 | Jain et al. | |
| 2011/0246826 A1* | 10/2011 | Hsieh | H04L 41/046 714/20 |
| 2011/0296375 A1 | 12/2011 | Mooney | |
| 2011/0314071 A1* | 12/2011 | Johnson | G06F 16/13 707/827 |
| 2012/0254116 A1 | 10/2012 | Eno et al. | |
| 2012/0323977 A1 | 12/2012 | Fortier et al. | |
| 2013/0091207 A1 | 4/2013 | Diab | |
| 2013/0263289 A1* | 10/2013 | Vijayan | H04L 67/1095 726/31 |
| 2014/0122424 A1* | 5/2014 | Barnes | G06F 16/13 707/610 |
| 2014/0136571 A1 | 5/2014 | Bonvin et al. | |
| 2014/0136782 A1* | 5/2014 | Thomas | G06F 3/0664 711/117 |
| 2014/0344234 A1* | 11/2014 | Amarendran | G06F 11/1458 707/694 |
| 2016/0224651 A1* | 8/2016 | Kumarasamy | G06F 16/275 |

* cited by examiner

| METADATA | DATA TYPE | COMMENT |
|---|---|---|
| ANTICIPATED USAGE | BANDWIDTH REQUIREMENT (E.G., STANDARD DEF VS. HIGH DEF) | CORE |
| DATA IMPORTANCE | VALUE 1-10 | CORE |
| USER IMPORTANCE | VALUE 1-10 | OPTIONAL |
| EVENT | START DATE/TIME + END DATE/TIME | OPTIONAL |
| ORIGIN | CITY, COUNTRY, DATA CENTER (N DIGIT CODES) | CORE |
| DESTINATION BY EVENT | CITY, COUNTRY, DATA CENTER (N DIGIT CODES) | OPTIONAL |
| ROUTE | LIST OF CITIES, COUNTRIES, DATA CENTER (LIST OF N DIGIT CODES) | OPTIONAL |
| IMPORTANCE REDUCTION FACTOR | VALUE 1-1/10 | CORE, MULTIPLY USER AND DATA IMPORTANCE BY THIS FACTOR EACH 24 HOURS AFTER THE EVENT'S END DATA/TIME |

DATA PLACEMENT OPTIMIZATION IN A STORAGE SYSTEM ACCORDING TO USAGE AND DIRECTIVE METADATA EMBEDDED WITHIN THE DATA

CROSS REFERENCE TO RELATED APPLICATIONS

This Application is a Continuation of U.S. patent application Ser. No. 13/764,064, filed on Feb. 11, 2013.

BACKGROUND OF THE INVENTION

Field of the Invention

The present invention relates in general to computers, and more particularly to improving data/file placement optimization in a computing storage environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components. One of the many challenges of these computing system is storing, placing, and arranging data files in such a way that allows for quick and timely access to the files.

SUMMARY OF THE DESCRIBED EMBODIMENTS

Various embodiments are provided for improving data placement optimization using a processor device. In one embodiment, a method comprises monitoring for a file creation event, wherein a file is created; embedding anticipated usage metadata and directive metadata within data content of the file by an application layer during the creation of the file, the anticipated usage metadata containing a plurality of attributes describing characteristics of the file and the directive metadata containing directives comprising storage instructions for the file; updating the anticipated usage metadata and the directive metadata in real time according to a frequency of access of the file; adding a set of core metadata to the file at the time of the file creation, the core metadata comprising at least a bandwidth requirement for processing the file and an importance factor of the file as assigned to the attached anticipated usage metadata and the directive metadata such that the importance factor signifies how essential the anticipated usage metadata and the directive metadata are to be followed when determining the file placement; wherein the core metadata further indicates the importance factor to a storage controller of the storage system for performing resource allocation operations to process the file by the storage controller so as to allocate enough resources by the storage controller to the file to ensure the bandwidth requirement for processing the file is satisfied during file access; and executing the directive metadata containing the storage instructions for the file.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, computing systems are used to store and manage a variety of types of data and/or files. One of the many challenges of these computing system is storing, placing, and arranging data files in such a way that allows quick and timely access to the files. In one embodiment, as used herein, the term file optimization refers to determining what storage system tier (e.g., solid state drive 'SSD', disk, tape, etc.) should be used for a given piece of data (e.g., a file) based on predefined policies and/or real time metrics. In one embodiment, the present invention provides a solution that improves data (e.g., file) placement optimization by connecting an application layer with individual data elements. In one embodiment, the present invention allows the application layer (and/or a user) to attach either "directives" or "anticipated usage" metadata to storage elements (e.g., the file level not the block level) that influence the storage layer controller's placement decisions. The directives and metadata may contain time, scope, duration, and other elements that will let the storage controller better anticipate future usage patterns so that the storage controller can proactively move data to storage tiers that are appropriate for that anticipated future usage. In one embodiment, for improving data placement optimization in the computing storage environment, an application layer and/or a user is allowed to attach an anticipated usage of files metadata and a directive metadata to a file. In one embodiment, data owners and/or applications are allowed to attach metadata to the file that gives the storage controller directives or information as to how that data/file will be used in the future.

In one embodiment, the present invention provides a system that improves data/file placement optimization by allowing the application layer (or user/consumer) to attach either "directives" or "anticipated usage" metadata to one or more files in a storage subsystem. This directive metadata and/or anticipated usage of a file metadata can be consumed by the storage manager (e.g., IBM® SVC, physical storage controller, VIO® server, etc.) and influence the storage manager's placement decisions. In one embodiment, directives are metadata that give specific instructions to a storage manager on actions that either should or could be taken that relate specifically to the file(s) to which the directive metadata attached. To assist with passing directives from instances to the storage framework, a set of architectural interfaces are defined for specifying such directives. Anticipated usage metadata are informational attributes that describe characteristics about the file that the storage manager may also use to improve placement decisions. The anticipated usage metadata may contain time, scope, duration, and other elements.

The directive metadata and anticipated usage metadata allow the storage controller to more accurately anticipate future usage patterns so that the storage controller may proactively move data and/or files to storage tiers that are appropriate for that anticipated future usage. Directives may also be passed from each guest instance directing how data blocks should be distributed. In one embodiment, on a host system, the guest instance indicates an operating system running on a virtual machine (in contrast to the hypervisor instance). Thus, overall locality of data is encouraged, which improves storage performance benefitting workloads. Moreover, by allowing either an application layer and a user to attach an anticipated usage of files metadata and a directive metadata (e.g., attaching directives as metadata) to a file, data or file placement optimization is enhanced and more effective because the results are more accurate and actionable than by simply placing static business policies in the metadata.

Moreover, the present invention requires each server/storage system en-route to various edge servers to execute directives, which eventually pushes files out to the edge servers. There is no redirecting of user to the edge servers in the present invention. Also, there is no central policy server to be maintained because policies may be included in the form of anticipated usage or directives that is attached to the data content itself. In one embodiment, the present invention automates the process of turning anticipated usage into directives and automatically executing those directives on the server/storage system en-route to the final destination(s) at appropriate time thereby eliminating any required and/or explicit end-user action.

Figure 1:
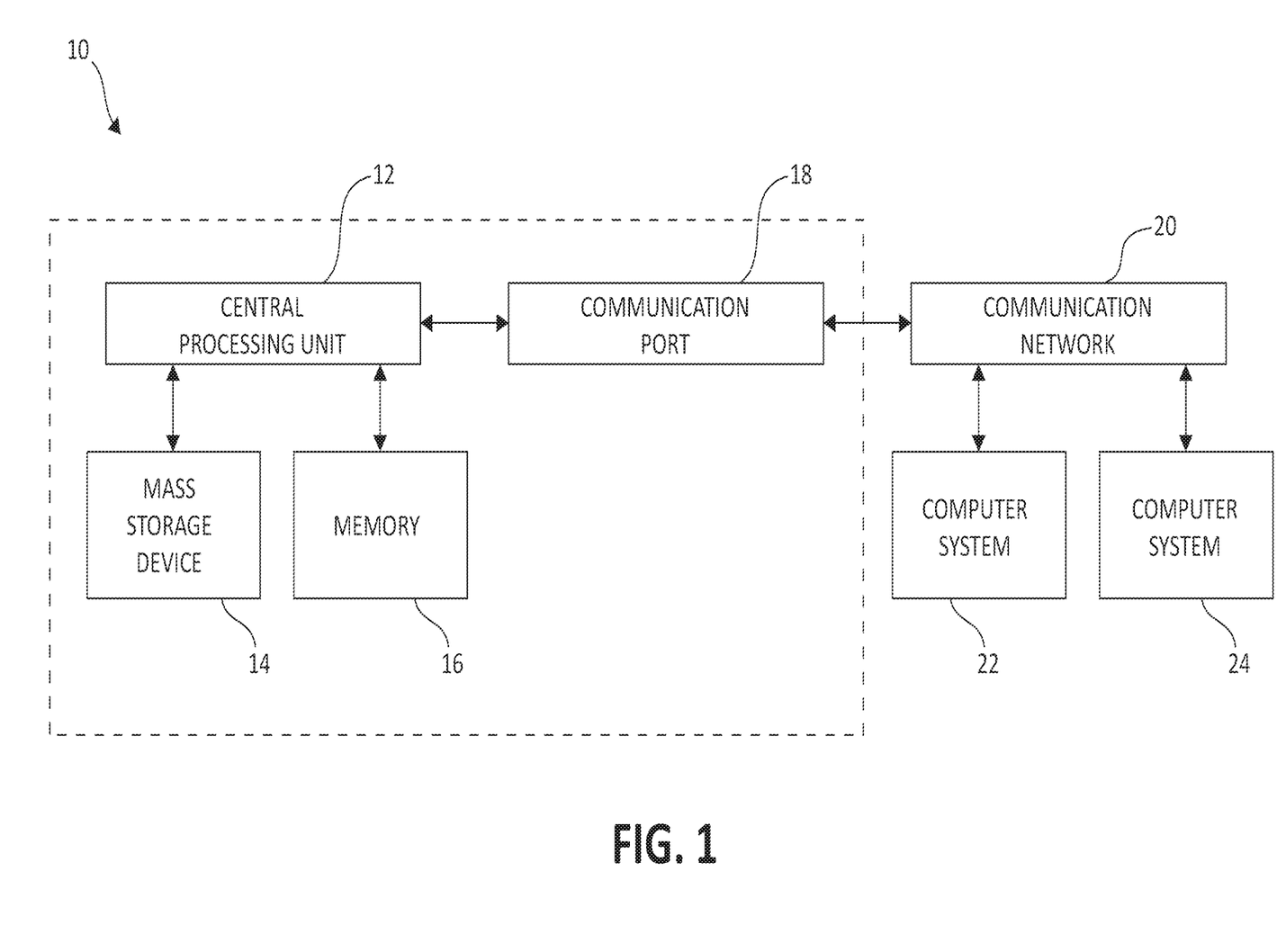
FIG. 1 is a block diagram illustrating a computer storage environment having an exemplary storage device in which aspects of the present invention may be realized.

Turning now to FIG. 1, exemplary architecture 10 of data storage systems in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
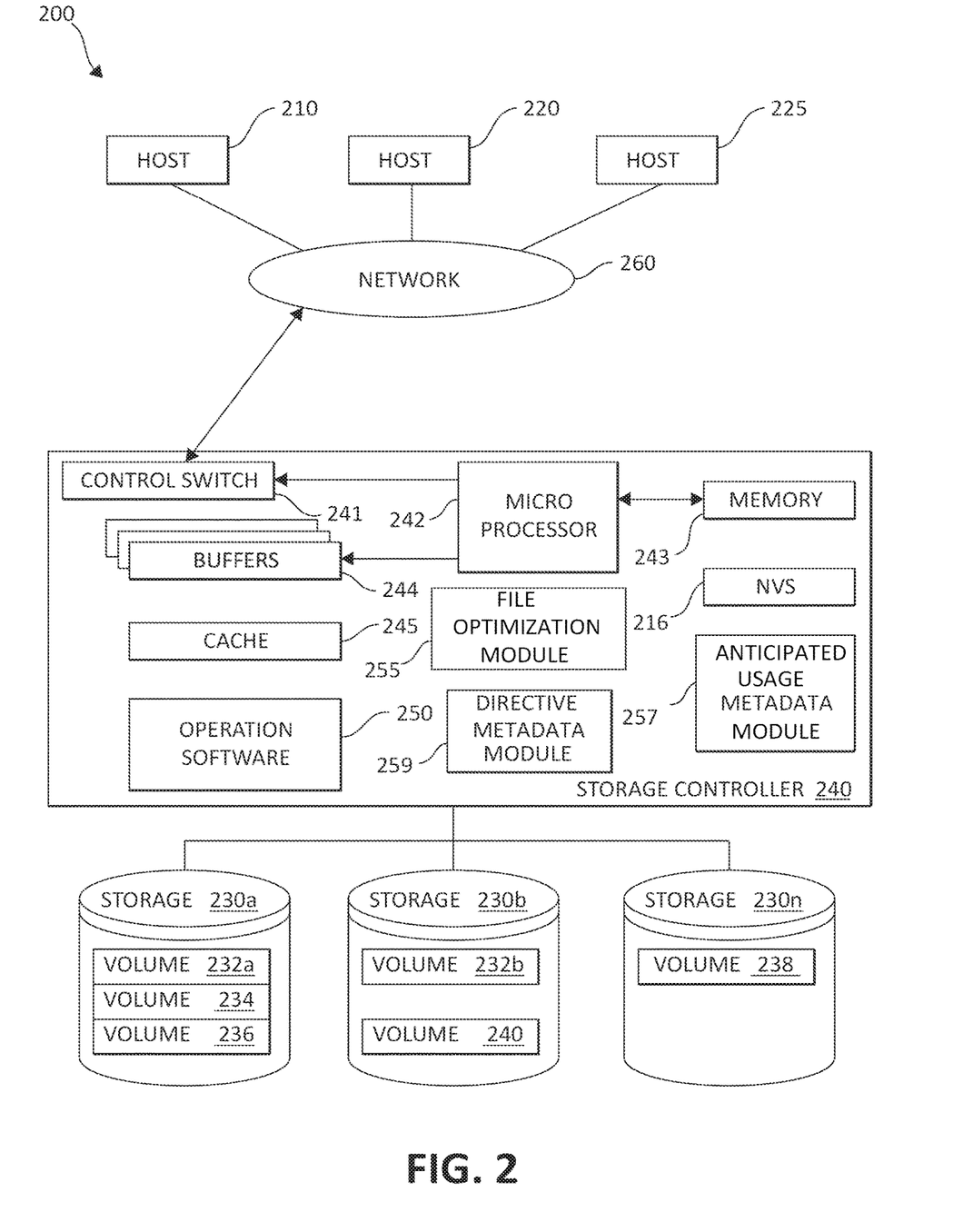
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computer storage environment. In one embodiment, system memory 243 includes, is associated, or is in communication with the operation software 250 in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a file optimization module 255, an anticipated usage metadata module 257, and a directive metadata module 259 in a computer storage environment. The file optimization module 255, the anticipated usage metadata module 257, and the directive metadata module 259 may work in conjunction with each and every component of the storage controller 240, the hosts 210, 220, 225, and storage devices 230. The file optimization module 255, the anticipated usage metadata module 257, and the directive metadata module 259 may be structurally one complete module working together and in conjunction with each other for performing such functionality as described below, or may be individual modules. The file optimization module 255, the anticipated usage metadata module 257, and the directive metadata module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the file optimization module 255, the anticipated usage metadata module 257, and the directive metadata module 259 on which information may be set. Multiple buffers 244 may be implemented with the present invention in a computing environment, or performing other functionality in accordance with the mechanisms of the illustrated embodiments.

In one embodiment, by way of example only, the host computers or one or more physical or virtual devices, 210, 220, 225 and the storage controller 240 are connected through a network adaptor (this could be a fiber channel) 260 as an interface i.e., via a switch sometimes referred to as "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the file optimization module 255, the anticipated usage metadata module 257, and the directive metadata module 259 are in communication with each other and may be separate or one individual component(s). Also, several, if not all of the components, such as the operation software 245 may be included with the memory 243 in a computer storage environment. Each of the components within the storage device may be linked together and may be in communication with each other for purposes suited to the present invention.

Figure 3:
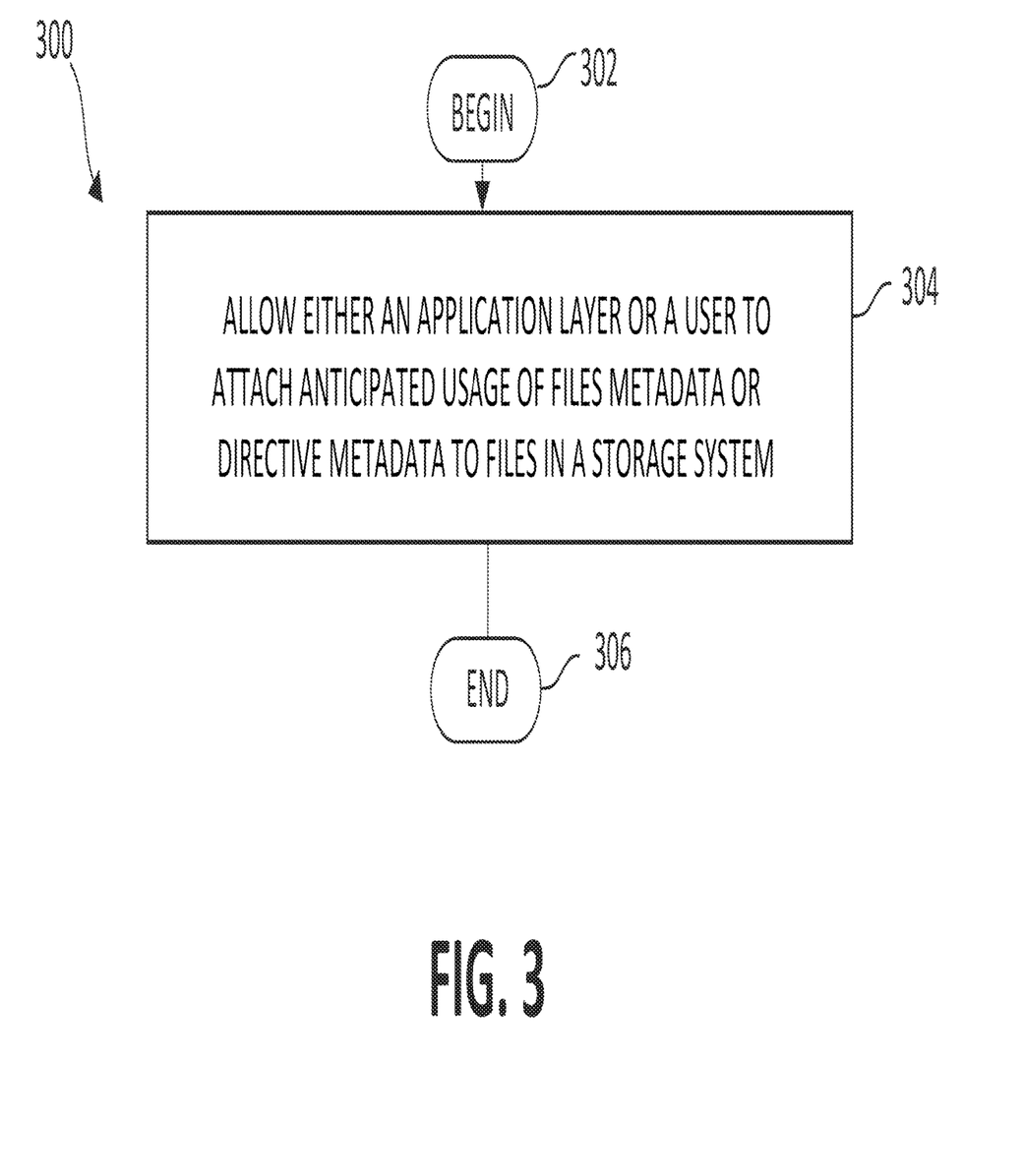
FIG. 3 is a flow chart diagram illustrating an exemplary method for improving data placement optimization in a computing storage environment by attaching an anticipated usage of files metadata and a directive metadata to a file in which aspects of the present invention may be realized.

Turning now to FIG. 3, a flow chart diagram illustrating an exemplary method 300 for improving data placement optimization in a computing storage environment by attaching an anticipated usage of files metadata and a directive metadata to a file in which aspects of the present invention may be realized is depicted. The method 300 begins (step 302) by allowing either an application layer and/or a user to attach anticipated usage of files metadata and directive metadata to one or more files in a computing storage environment (step 304). The method 300 ends (step 306).

To further illustrate the present invention as described herein, consider the following example. Tom creates a video that shows the past 10 Masters Golf Tournament winners and highlights of the prior champions. The Masters is scheduled for April 5. Tom's website (application layer) allows him to attach some "directives" (e.g., directive metadata) that inform the system that Tom anticipates 1,500 people will watch this video between April 1 and April 4, and that 15,000 people will watch the video on April 5. Tom submits a second series of videos of personal interviews of all the players. Tom also attaches metadata to those videos that indicate that the videos will receive anticipated high usage between April 3 and April 8. The backend system is then able to read the directive metadata and use the directive metadata to proactively push the video files to Tier 1 storage 2 hours before the anticipated heavy usage on April 1 and April 3. Thus, as illustrated in the above example, either the application layer (website) and/or a user (Tom) is allowed to attach anticipated usage of files metadata and directive metadata to one or more files in a computing storage environment As such, in one embodiment, the embodiments described herein, provide for attaching "directives" as metadata to files and attaching "anticipated usage" metadata to files. The present invention provides a system that optimizes existing file placement algorithms by using the attached directive metadata and the anticipated usage of file metadata. The present invention extends optimization beyond the storage infrastructure into the edge-caching network (CDN/e.g. Akami) using the directive metadata and the anticipated usage of file metadata. In one embodiment, the present invention provides for automatically attaching the directive metadata and the anticipated usage of file metadata to one or more files based on the context of the file at the time the file was created (e.g. in the application layer).

Figure 4:
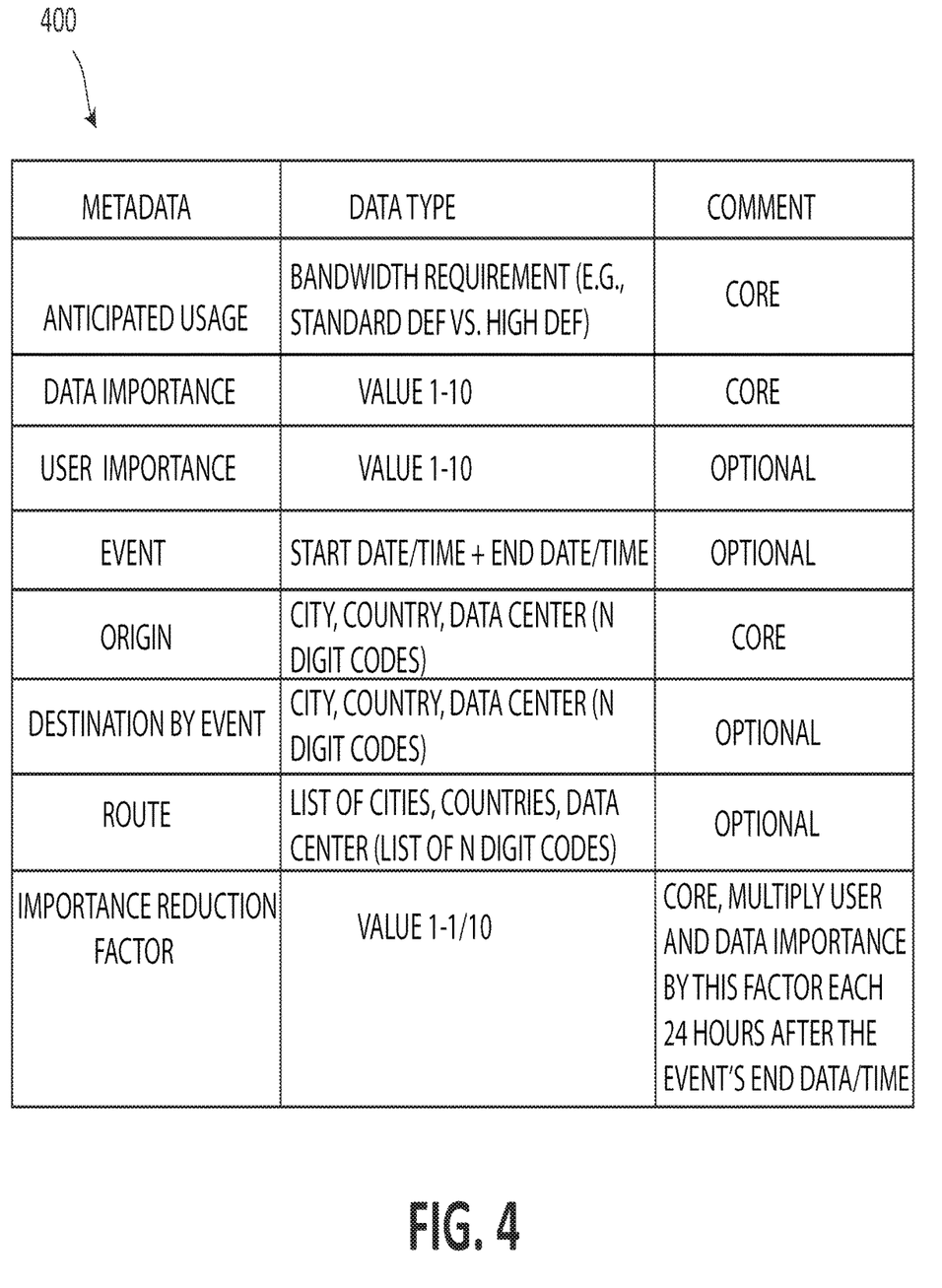
FIG. 4 is a table diagram illustrating an exemplary anticipated usage metadata schema in which aspects of the present invention may be realized.

Turning now to FIG. 4, a table diagram illustrating an exemplary anticipated usage metadata schema in which aspects of the present invention may be realized is depicted. As illustrated in FIG. 4, the table illustrates one embodiment of a schema for anticipated usage metadata. The columns show 1) the metadata, 2) the data type, and comments. The corresponding rows illustrate 1) anticipated usage, 2) the data importance, 3) the user importance, 4) the event, 5) the origin, 6) the destination by event, 7) the route, and 8) the importance reduction factor. Under the data type, the anticipated usage may be the bandwidth requirement (e.g., standard definition as compared to high definition) and this may be considered as core metadata, the importance of the data may be assigned a value from 1 to 10 and may be considered as core metadata, the user importance may be assigned a value from 1 to 10 and may be considered as optional metadata, the event may include the start date and/or start time and the end date and/or end time, but is optional metadata, the origin may include the city, county, and data center (with n digit codes for each) and may be considered as optional metadata, the destination by event may include the city, county, and data center (with n digit codes for each) and may be considered as optional metadata, the route may include a list of each city, county, and data center (with n digit codes for each) and may be considered as optional metadata, and finally, the importance reduction factor may be assigned a value from 1 to 10 and may be considered as core metadata but for the importance reduction factor, the user importance and the data importance is multiplied by the value of the importance reduction factor each 24 hours after the event's end data and/or end time. In one embodiment, as used herein, the term "core" (e.g., core metadata) is used to give a sense of importance to an attached directive metadata (or anticipated usage metadata), in contrast to "optional" metadata which are meant to assist in refinement, and thus not considered crucial. The core metadata gives a stronger hint to the controller and should be used in driving allocation activities that the controller performs.

In one embodiment, the operation of attaching anticipated usage metadata to files may be performed using a separate tool. In one embodiment, as used herein, a tool may be any computer program, application, and/or device and the like, such a GUI interface, that users may use to define and manipulate metadata. For example, a tool that Tom used to create the video allows him to edit and attach the metadata. The tool may then attach metadata to the file in some format known to a storage system. The tool may allow selecting a file system, directory, or individual files. The metadata may be spatial or temporal in nature indicating where and when the file(s) should be stored or pushed to in the storage environment. For example, spatial metadata may include specifying a certain storage area network (SAN), server, type of storage, geographic location (city, state, country, and the like) etc. Spatial metadata may also include an initial storage location and any and all new locations as the anticipated usage draws near. In one embodiment, temporal metadata may specify items or elements such as dates, days, or relative time (e.g. 4 days from today).

Figure 5:
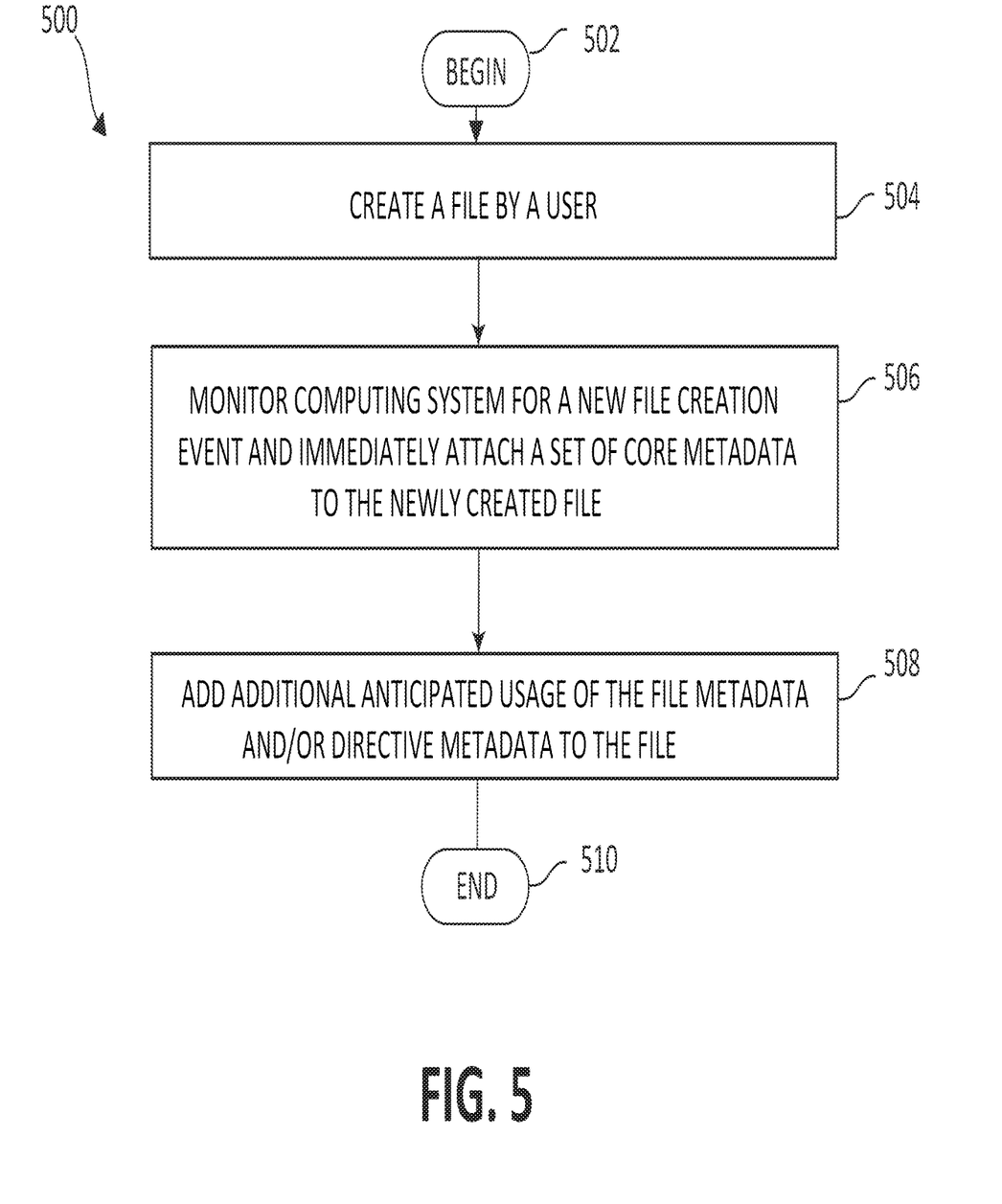
FIG. 5 is a flow chart diagram illustrating an additional exemplary method for attaching anticipated usage of files metadata and directive metadata to a file in which aspects of the present invention may be realized.

In addition, a storage manager may turn the anticipated usage data into a set of directives. For example, returning to the previous example above, if Tom indicates that his video files are likely to experience heavy load between April 1 and April 4, the storage manager may turn that information into a set of directives, such as store the file initially at location X, then on March 31 and move the file to locations Y, Z, and W. Then on April 1, 2 hours before the start of some event, move the file to locations (e.g. servers) M and N, etc. At any point in time, the anticipated usage metadata and the directive metadata may be updated on the fly with new, altered, modified, and/or additional anticipated usage metadata or directive metadata, or in other words, updated in real time. FIG. 5 below is one embodiment for attaching anticipated usage of files metadata and directive metadata to a file as just described.

FIG. 5 is a flow chart diagram illustrating an additional exemplary method 500 for attaching an anticipated usage of files metadata and a directive metadata to a file in which aspects of the present invention may be realized. The method 500 begins (step 502) by creating a file by a user (step 504). The method 500 monitors the computing storage system for a new file creation event and immediately attaches a set of core metadata to the newly created file (step 506). The method 500 adds additional anticipated usage of the file metadata and/or directive metadata to the file(s) in the storage system (step 508). The method 500 ends (step 510).

However, in one embodiment, the operations of attaching "directives" as metadata to files may include the following operations. First, the directives (e.g., the directive metadata) are specific instructions to the computing system that are executed en-route to a destination (e.g., the storage destination of the file). The metadata, such as described above (more specifically as illustrated in FIG. 4), are used to generate directives for the computing system to execute/perform. For example, the following are examples of directives that may be included in the directive metadata:

1. If today's date is past End Date, multiply Data Importance by Importance Reduction Factor and if the new Data Importance is 1 or less, delete the file.
2. If user rewinds video between timelines 2 min to 4 min, put up a link to more information regarding the footage.

3. If the current location is not the Destination and today is the day before Start Date, then send the file and metadata to the next destination on the list.
4. If the user is watching the first video in the series, make the next video in the series available to her when the current video finishes.

In one embodiment, there are two types of directives: local directives and cascading directives. A local directive is executed/performed on a current system. A cascading directive is sent to a next/subsequent destination en-route to a final destination. In one embodiment, there is also a transition from a cascading directive to a local directive once the directive metadata arrives at the target destination system. Cascading directives allow for automatically taking appropriate action on each destination at the right, most accurate time. For example, for a circus show planned for multiple locations, cascading directives give the impression of a moving exhibit. The impression of a moving exhibit is used to mean that the present invention may potentially set the time for the showing of videos so that the videos follow the timeline of how they were performed at different locations.

Continuing on, in one embodiment, the present invention provides a computing system with the ability to optimize existing file placement algorithms by using the attached metadata (e.g., directive metadata and/or anticipated usage metadata) as described above. In one embodiment, the present invention extends the file placement optimization beyond the storage infrastructure into an edge-caching network (e.g., content delivery network 'CDN' such as Akami®) using the directives and anticipated usage data. In one embodiment, a CDN is a large distributed system of servers deployed in multiple data centers in the Internet.

In one embodiment, a hardware and/or software entity, located either on the storage system or on a server) may periodically scan the directives (e.g., the directive metadata) and execute the directives that need to be carried out and executed. In one embodiment, the illustrated embodiments may generate directives (e.g., generate additional directive metadata) from other directives and/or anticipated usage patterns. For example, returning the example illustrated above, assume that on March 31 Tom's video file not only moves to location X but also a set of directives and/or anticipated usage data moves to location X. The directives metadata and anticipated usage metadata is meant for location X to act upon. As location X acts upon the directives metadata and anticipated usage metadata at the appropriate time, the transfer of the video file may include further directives for locations Y, Z, and W. And so on and so forth. Each movement of files may be accompanied by metadata achieving the cascading effect.

Figure 6:
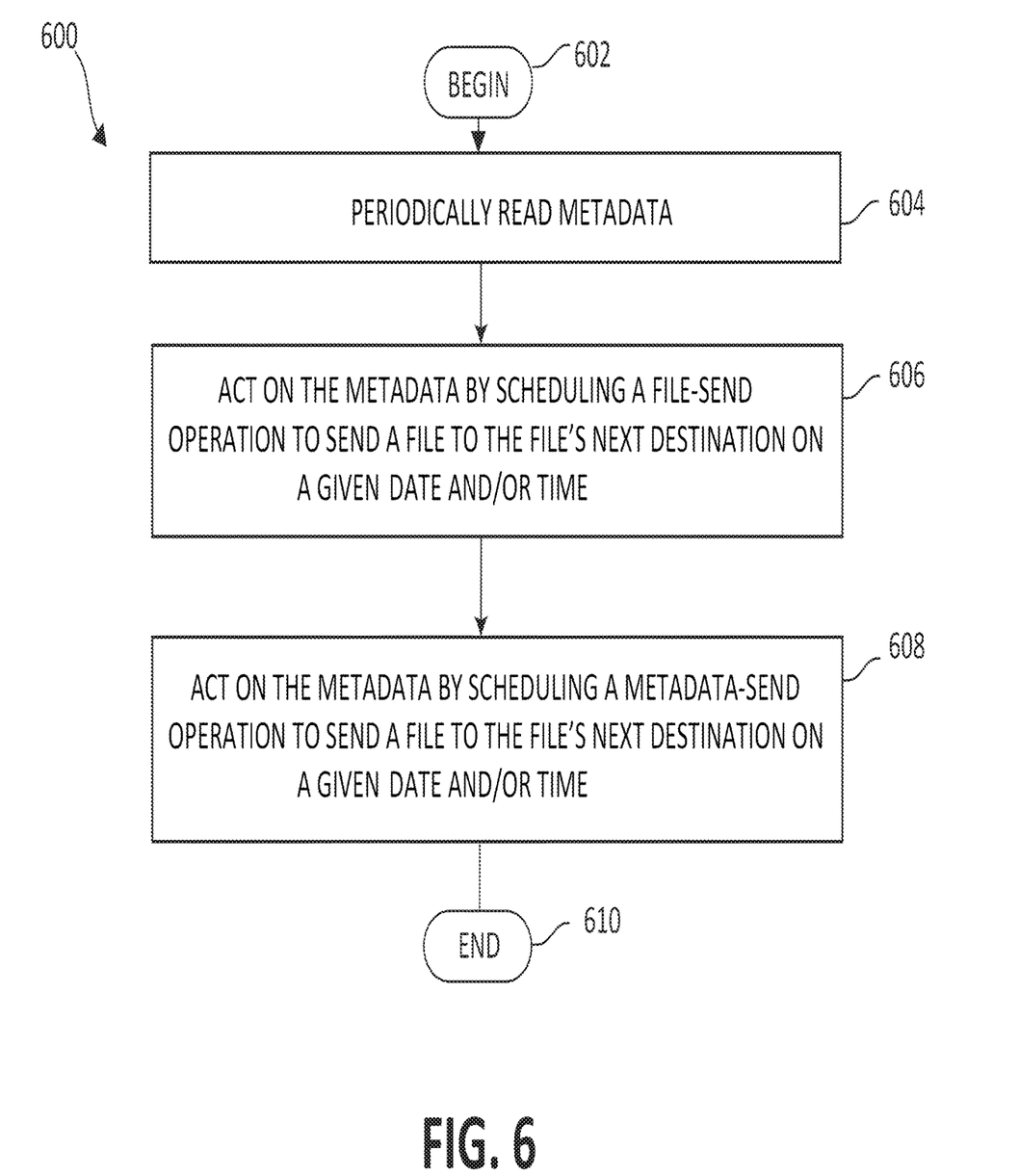
FIG. 6 is a flow chart diagram illustrating an additional exemplary method for optimizing file placement using the attached anticipated usage of files metadata and directive metadata to a file in which aspects of the present invention may be realized.

FIG. 6 is a flow chart diagram illustrating an additional exemplary method 600 for optimizing file placement using the attached anticipated usage of files metadata and directive metadata to a file in which aspects of the present invention may be realized. The method 600 periodically reads metadata of a file (step 604). The method 600 acts on the metadata by scheduling a file-send operation to send a file to the file's next destination on a given date and/or time (step 606). The method 600 acts on the metadata by scheduling a metadata-send operation to send a file to the file's next destination on a given date and/or time (step 608). The method 600 ends (step 610).

Figure 7:
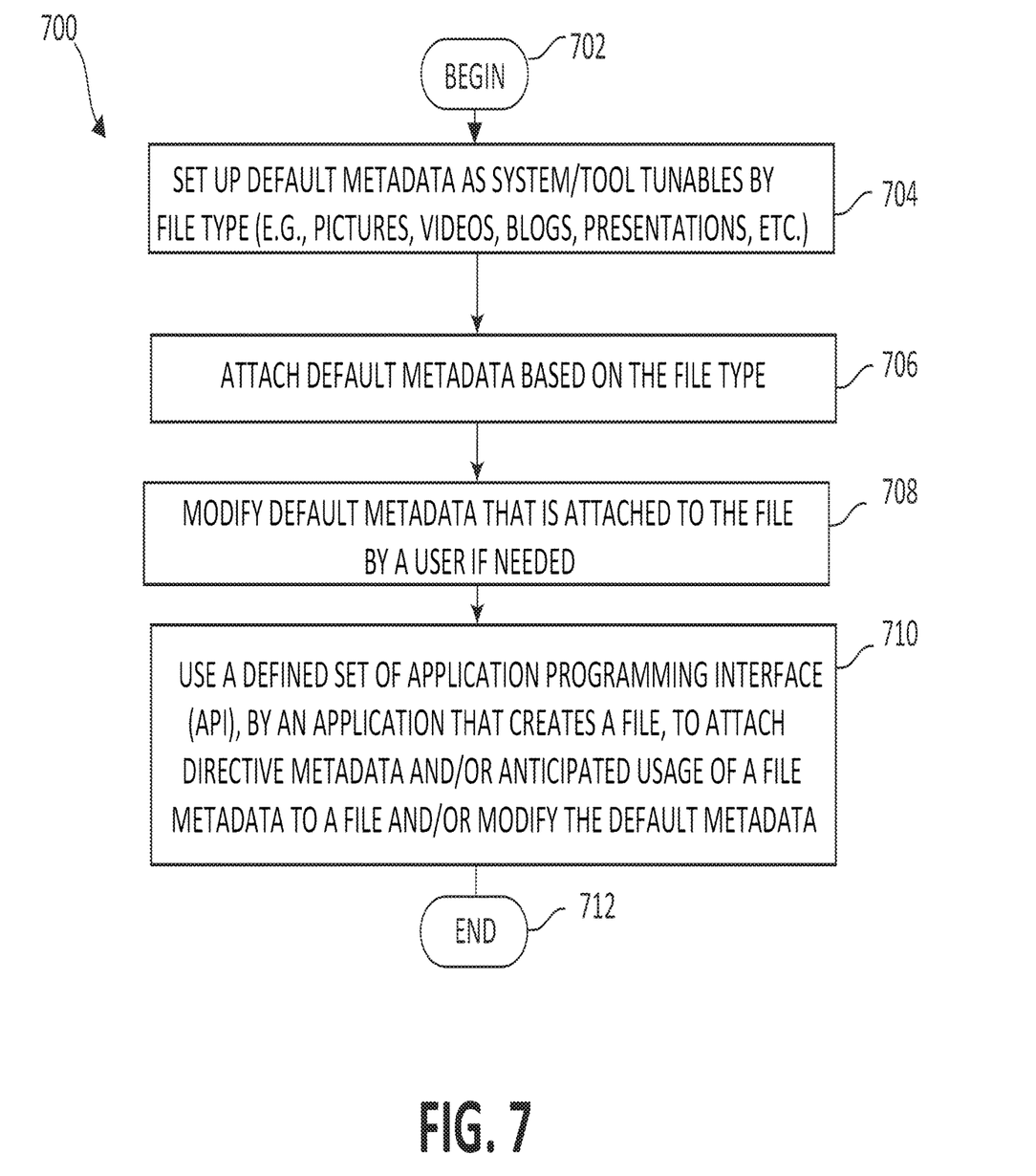
FIG. 7 is a flow chart diagram illustrating an additional exemplary method for automatically attaching anticipated usage of files metadata and directive metadata to a file based on the context of the file at the time the file was created in which aspects of the present invention may be realized.

In one embodiment, the present invention provides for automatically attaching the directives and anticipated usage (e.g., the directives metadata and anticipated usage metadata) to one or more files based on the context (e.g., the situation surrounding the file creation, such as whether the file creation was part of a multiple-file load) at the time the file was created (e.g. in the application layer). For example, automatically attaching the directives and anticipated usage metadata may follow user specified default policies regarding directives and/or anticipated usage based on file types, directories, and the like. This process may is similar to compressing files that have not changed, that have not been accessed in a long time, or archiving a set of files based on the usage history. Thus, the present invention may include providing an application programming interface (API) in order to create, attach, and/or modify directives and anticipated usage patterns from the various applications. FIG. 7 illustrates an exemplary embodiment for automatically attaching the directives and anticipated usage to one or more files.

FIG. 7 is a flow chart diagram illustrating an additional exemplary method 700 for automatically attaching an anticipated usage of files metadata and a directive metadata to a file based on the context of the file at the time the file was created in which aspects of the present invention may be realized. The method 700 sets up default metadata, by a user, as system/tool tunables (e.g., configuration parameters) by file type (e.g., pictures, videos, blogs, presentations, etc.) (step 704). The method 700 attaches default metadata based on the file type (step 706). If needed (as an option), a user may modify the default metadata that is attached to the file(s) (step 708). The method 700 uses a defined set of application programming interface (API), by an application that creates a file, to attach directive metadata and/or anticipated usage of file metadata to a file, and/or modify the default metadata (step 710). The method 700 ends (step 712).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for improving data placement optimization by a processor device in a computer storage system, the method comprising:
monitoring for a file creation event, wherein a file is created;
embedding anticipated usage metadata and directive metadata within data content of the file by an application layer during the creation of the file, the anticipated usage metadata containing a plurality of attributes describing characteristics of the file and the directive metadata containing directives comprising storage instructions to be used by a storage controller of the computer storage system when receiving the file for storage, wherein at least some portions of the embedded anticipated usage metadata and directive metadata comprise a set of core metadata for the file, and other portions of the embedded anticipated usage metadata and directive metadata comprise a set of discretionary metadata for the file;
scanning the anticipated usage metadata and directive metadata by the storage controller to determine when to execute those directives contained in the directive metadata;
weighting, by the storage controller, the plurality of attributes and storage instructions in those portions of the anticipated usage metadata and directive metadata within the set of core metadata more heavily than the plurality of attributes and storage instructions described in the other portions of the anticipated usage metadata and directive metadata within the set of discretionary metadata when determining a file placement within the computer storage system for the file, wherein the weighted plurality of attributes and storage instructions are used in lieu of determining the file placement by a general storage policy of the computer storage system, wherein those portions of the anticipated usage metadata within the core metadata are inclusive of an importance factor of the file signifying how expressly the storage controller is to follow the directive metadata when determining the file placement, the importance factor indicated to the storage controller, and wherein the storage controller performs resource allocation operations based on the indicated importance factor to allocate enough resources to the file to ensure a bandwidth requirement necessary to process the file is satisfied during access of the file;
executing the directive metadata containing the storage instructions for the file by the storage controller; and
updating the anticipated usage metadata and the directive metadata in real time according to a frequency of access of the file.

2. The method of claim 1, wherein the anticipated usage metadata includes at least one of time, scope, and duration for the file.

3. The method of claim 1, wherein the directive metadata is one of a local directive that is executed on a current system and a cascading directive that is sent to a next destination enroute to a final destination and allow for automatically executing each of an appropriate action on each destination at an appropriate time.

4. The method of claim 3, further including transitioning from the cascading directive to the local directive after the directive metadata arrives at a target system.

5. The method of claim 1, further including anticipating future usage patterns by using the anticipated usage metadata and the directive metadata for proactively moving data to one of a plurality of storage tiers.

6. The method of claim 1, further including optimizing the file placement using the anticipated usage metadata and the directive metadata.

7. The method of claim 6, further including extending the optimization of the file placement beyond a storage system infrastructure into an edge-caching network using the anticipated usage metadata and the directive metadata.

8. The method of claim 1, further including performing one of:
  reading the anticipated usage metadata and the directive metadata,
  scheduling a send file operation for sending the file to a next destination according to the anticipated usage metadata and the directive metadata,
  scheduling a send metadata operation for sending metadata to a next destination according to the anticipated usage metadata and the directive metadata.

9. The method of claim 1, further including performing one of:
  setting up default metadata as system tunable by a file type,
  embedding the default metadata on the file type,
  modifying the default metadata that is attached to the file, and
  using one of a plurality of defined application programming interfaces (API) for embedding to the anticipated usage metadata and the directive metadata.

10. A system for improving data placement optimization in a computer storage system, the system comprising:
  at least one processor device operable in the computer storage system, wherein the at least one processor device:
    monitors for a file creation event, wherein a file is created;
    embeds anticipated usage metadata and directive metadata within data content of the file by an application layer during the creation of the file, the anticipated usage metadata containing a plurality of attributes describing characteristics of the file and the directive metadata containing directives comprising storage instructions to be used by a storage controller of the computer storage system when receiving the file for storage, wherein at least some portions of the embedded anticipated usage metadata and directive metadata comprise a set of core metadata for the file, and other portions of the embedded anticipated usage metadata and directive metadata comprise a set of discretionary metadata for the file;
    scans the anticipated usage metadata and directive metadata by the storage controller to determine when to execute those directives contained in the directive metadata;
    weights, by the storage controller, the plurality of attributes and storage instructions in those portions of the anticipated usage metadata and directive metadata within the set of core metadata more heavily than the plurality of attributes and storage instructions described in the other portions of the anticipated usage metadata and directive metadata within the set of discretionary metadata when determining a file placement within the computer storage system for the file, wherein the weighted plurality of attributes and storage instructions are used in lieu of determining the file placement by a general storage policy of the computer storage system, wherein those portions of the anticipated usage metadata within the core metadata are inclusive of an importance factor of the file signifying how expressly the storage controller is to follow the directive metadata when determining the file placement, the importance factor indicated to the storage controller, and wherein the storage controller performs resource allocation operations based on the indicated importance factor to allocate enough resources to the file to ensure a bandwidth requirement necessary to process the file is satisfied during access of the file;
    executes the directive metadata containing the storage instructions for the file by the storage controller; and
    updates the anticipated usage metadata and the directive metadata in real time according to a frequency of access of the file.

11. The system of claim 10, wherein the anticipated usage metadata includes at least one of time, scope, and duration for the file.

12. The system of claim 10, wherein the directive metadata is one of a local directive that is executed on a current system and a cascading directive that is sent to a next destination enroute to a final destination and allow for automatically executing each of an appropriate action on each destination at an appropriate time.

13. The system of claim 12, wherein the at least one processor device transitions from the cascading directive to the local directive after the directive metadata arrives at a target system.

14. The system of claim 10, wherein the at least one processor device anticipates future usage patterns by using the anticipated usage metadata and the directive metadata for proactively moving data to one of a plurality of storage tiers.

15. The system of claim 10, wherein the at least one processor device optimizes the file placement using the anticipated usage metadata and the directive metadata.

16. The system of claim 15, wherein the at least one processor device extends the optimization of the file placement beyond a storage system infrastructure into an edge caching network using the anticipated usage metadata and the directive metadata.

17. The system of claim 10, wherein the at least one processor device performs one of:
  reading the anticipated usage metadata and the directive metadata,
  scheduling a send file operation for sending the file to a next destination according to the anticipated usage metadata and the directive metadata,
  scheduling a send metadata operation for sending metadata to a next destination according to the anticipated usage metadata and the directive metadata.

18. The system of claim 10, wherein the at least one processor device performs one of:
  setting up default metadata as system tunable by a file type,
  embeds the default metadata on the file type, modifying the default metadata that is attached to the file, and using one of a plurality of defined application programming interfaces (API) for embedding to the anticipated usage metadata and the directive metadata.

19. A computer program product for reducing data loss in a computing storage system by a processor device, the computer program product comprising a computer-readable storage medium having computer-readable program code portions stored therein, the computer-readable program code portions comprising:

an executable portion that monitors for a file creation event, wherein a file is created;

an executable portion that embeds anticipated usage metadata and directive metadata within data content of the file by an application layer during the creation of the file, the anticipated usage metadata containing a plurality of attributes describing characteristics of the file and the directive metadata containing directives comprising storage instructions to be used by a storage controller of the computer storage system when receiving the file for storage, wherein at least some portions of the embedded anticipated usage metadata and directive metadata comprise a set of core metadata for the file, and other portions of the embedded anticipated usage metadata and directive metadata comprise a set of discretionary metadata for the file;

an executable portion that scans the anticipated usage metadata and directive metadata by the storage controller to determine when to execute those directives contained in the directive metadata;

an executable portion that weights, by the storage controller, the plurality of attributes and storage instructions in those portions of the anticipated usage metadata and directive metadata within the set of core metadata more heavily than the plurality of attributes and storage instructions described in the other portions of the anticipated usage metadata and directive metadata within the set of discretionary metadata when determining a file placement within the computer storage system for the file, wherein the weighted plurality of attributes and storage instructions are used in lieu of determining the file placement by a general storage policy of the computer storage system, wherein those portions of the anticipated usage metadata within the core metadata are inclusive of an importance factor of the file signifying how expressly the storage controller is to follow the directive metadata when determining the file placement, the importance factor indicated to the storage controller, and wherein the storage controller performs resource allocation operations based on the indicated importance factor to allocate enough resources to the file to ensure a bandwidth requirement necessary to process the file is satisfied during access of the file;

an executable portion that executes the directive metadata containing the storage instructions for the file by the storage controller; and an executable portion that updates the anticipated usage metadata and the directive metadata in real time according to a frequency of access of the file.

20. The computer program product of claim 19, wherein the anticipated usage metadata includes at least one of time, scope, and duration for the file.

21. The computer program product of claim 19, wherein the directive metadata is one of a local directive that is executed on a current system and a cascading directive that is sent to a next destination enroute to a final destination and allow for automatically executing each of an appropriate action on each destination at an appropriate time.

22. The computer program product of claim 21, further including an executable portion that transitions from the cascading directive to the local directive after the directive metadata arrives at a target system.

23. The computer program product of claim 19, further including an executable portion that anticipates future usage patterns by using the anticipated usage metadata and the directive metadata for proactively moving data to one of a plurality of storage tiers.

24. The computer program product of claim 19, further including an executable portion that optimizes the file placement using the anticipated usage metadata and the directive metadata.

25. The computer program product of claim 24, further including an executable portion that extends the optimization of the file placement beyond a storage system infrastructure into an edge caching network using the anticipated usage metadata and the directive metadata.

26. The computer program product of claim 19, further including an executable portion that performs one of:
reading the anticipated usage metadata and the directive metadata,
scheduling a send file operation for sending the file to a next destination according to the anticipated usage metadata and the directive metadata,
scheduling a send metadata operation for sending metadata to a next destination according to the anticipated usage metadata and the directive metadata.

27. The computer program product of claim 19, further including an executable portion that performs one of:
setting up default metadata as system tunable by a file type,
embedding the default metadata on the file type,
modifying the default metadata that is attached to the file, and
using one of a plurality of defined application programming interfaces (API) for embedding to the anticipated usage metadata and the directive metadata.

* * * * *